United States Patent
Pham et al.

[11] Patent Number: 5,771,372
[45] Date of Patent: Jun. 23, 1998

[54] APPARATUS FOR DELAYING THE OUTPUT OF DATA ONTO A SYSTEM BUS

[75] Inventors: Dac Cong Pham, Round Rock; Mark David Sweet; Cang Tran, both of Austin, all of Tex.

[73] Assignee: International Business Machines Corp., Armonk, N.Y.

[21] Appl. No.: 538,529

[22] Filed: Oct. 3, 1995

[51] Int. Cl.⁶ ........................................ G06F 1/04
[52] U.S. Cl. ............................. 395/551; 395/559
[58] Field of Search .................... 395/559, 551, 395/306, 308, 309, 311

[56] References Cited

U.S. PATENT DOCUMENTS 5,600,824 2/1997 Williams et al. ...................... 395/551

*Primary Examiner*—Dennis M. Butler
*Attorney, Agent, or Firm*—Kelly K. Kordzik; Winstead Sechrest & Minick P.C.; Michael A. Davis, Jr.

[57] ABSTRACT

Circuitry within a processor delays the launching of data onto an external bus by a factor that is proportional to the ratio of an internal processor clock speed to the system or external bus clock speed. This delay provides a delay in the launching of data to external bus devices so that these slower speed external bus devices have enough time to capture the data.

14 Claims, 3 Drawing Sheets

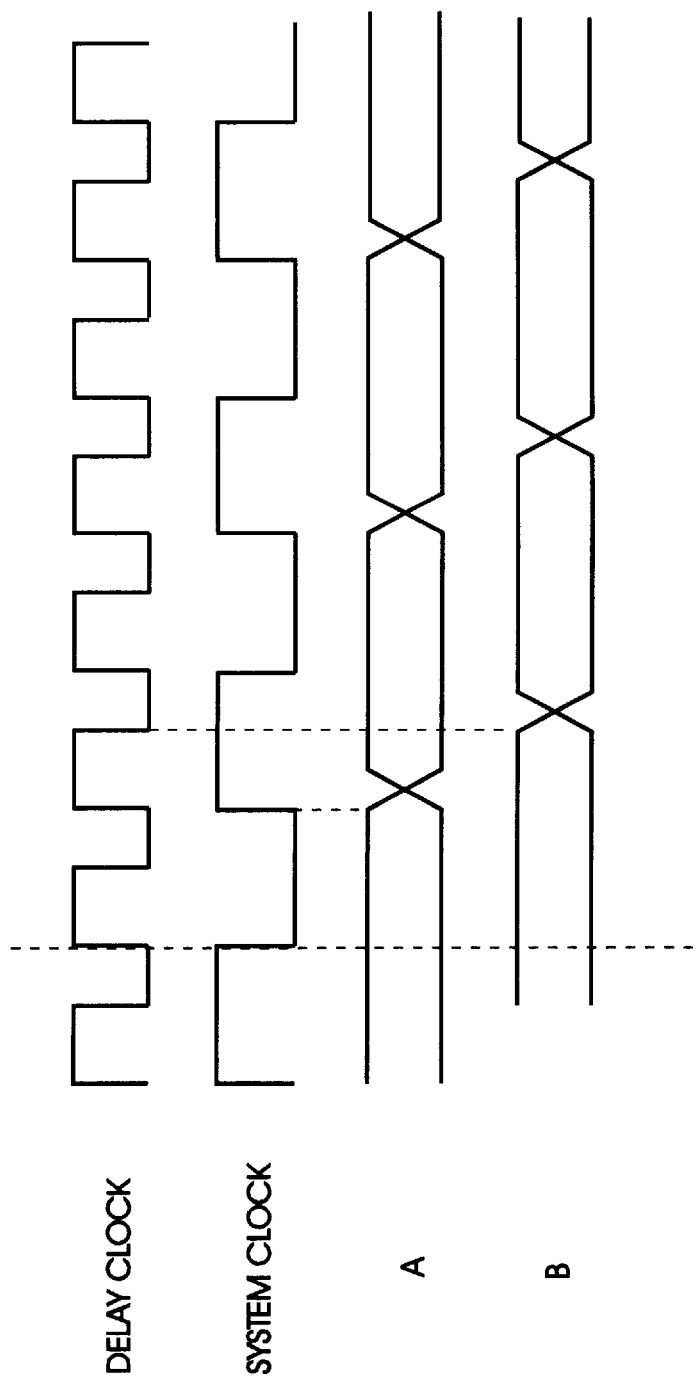

APPARATUS FOR DELAYING THE OUTPUT OF DATA ONTO A SYSTEM BUS

TECHNICAL FIELD

The present application relates in general to data processing systems, and in particular, to a circuit for allowing a processor to communicate data to a bus device operating at a slower speed.

BACKGROUND

High performance microprocessors ("CPUs") run at higher internal clock speeds than are used on external buses utilized to couple the processor to other bus devices, such as ASICs (application specific integrated circuits), external memory devices, I/O (input/output) devices, etc.

In typical implementations, data is launched onto the external bus by the processor on the active edge of the external clock (system or bus clock speed). Slower external bus devices may miss this data because internal delay from their clock pins to their internal latches can be longer than the delay from their data pins to the internal latch data pins. This is often true because incoming data to a bus device may only be sent to a few places within the device, while clock signals are distributed throughout the chip containing the bus device.

Thus, the problem is that incoming data to a slower bus device needs to be held valid long enough for a clock signal to arrive at that data stage within the bus device. This discrepancy has traditionally been handled by specifying a hold time between the clock edge and the data change edge, so that the clock delays in the slower external portions do not cause them to miss data launched on the bus by the processor. This hold time is often implemented with buffers for the data to take into account the inherent buffering provided to the clock signal within the external bus device.

The problem with such a solution is that as microprocessors are designed to be faster and faster, it becomes increasingly difficult to design a delay that is a substantial portion of the total clock time and is consistent across process variations. When board designers of external bus devices are requesting hold times on the order of three nanoseconds and microprocessors are being designed with gate delays in the 150picosecond range, designing a delay line that is an order of magnitude as long as a nominal gate delay is problematic. Furthermore, as the design of processors involves the "tweaking" of the internal speed of the processors to faster and faster speeds, these imbedded delays within the bus devices eventually become insufficient. Moreover, these imbedded delays within the clock devices may cost more silicon to implement.

Thus, what is needed in the art is a process independent delay that provides the requisite hold time for the data sent to a slower external bus device from a processor.

SUMMARY OF THE INVENTION

The foregoing need is satisfied by the present invention, which implements a delay that is a ratio of an internal clock speed within the processor to the external clock speed on the external bus coupling the processor to external bus devices. This is accomplished by latching the data to be launched onto the external bus with a latch circuit that is timed with a clock signal that is faster than the external bus clock. This provides a delay in the launch of the data.

One advantage of the present invention is that it does not require a delay line that may be a difficult portion to design and requires more area (silicon) on a chip.

Another advantage of the present invention is that the hold time is based on a clock instead of a process dependent delay. This means that the hold time specification is the same for a fast external device as a slow external device, allowing speed sorting of devices without respecifying the hold time.

Yet another advantage of the present invention is that it allows for a design that can be ported to a faster technology without redesigning the bus interface to maintain the hold time.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present disclosure, and the advantages thereof, reference is now made to the following descriptions taken in conjunction with the accompanying drawings, in which:

FIG. 3 illustrates a timing diagram illustrating an embodiment of the present disclosure.

DETAILED DESCRIPTION

Figure 1:
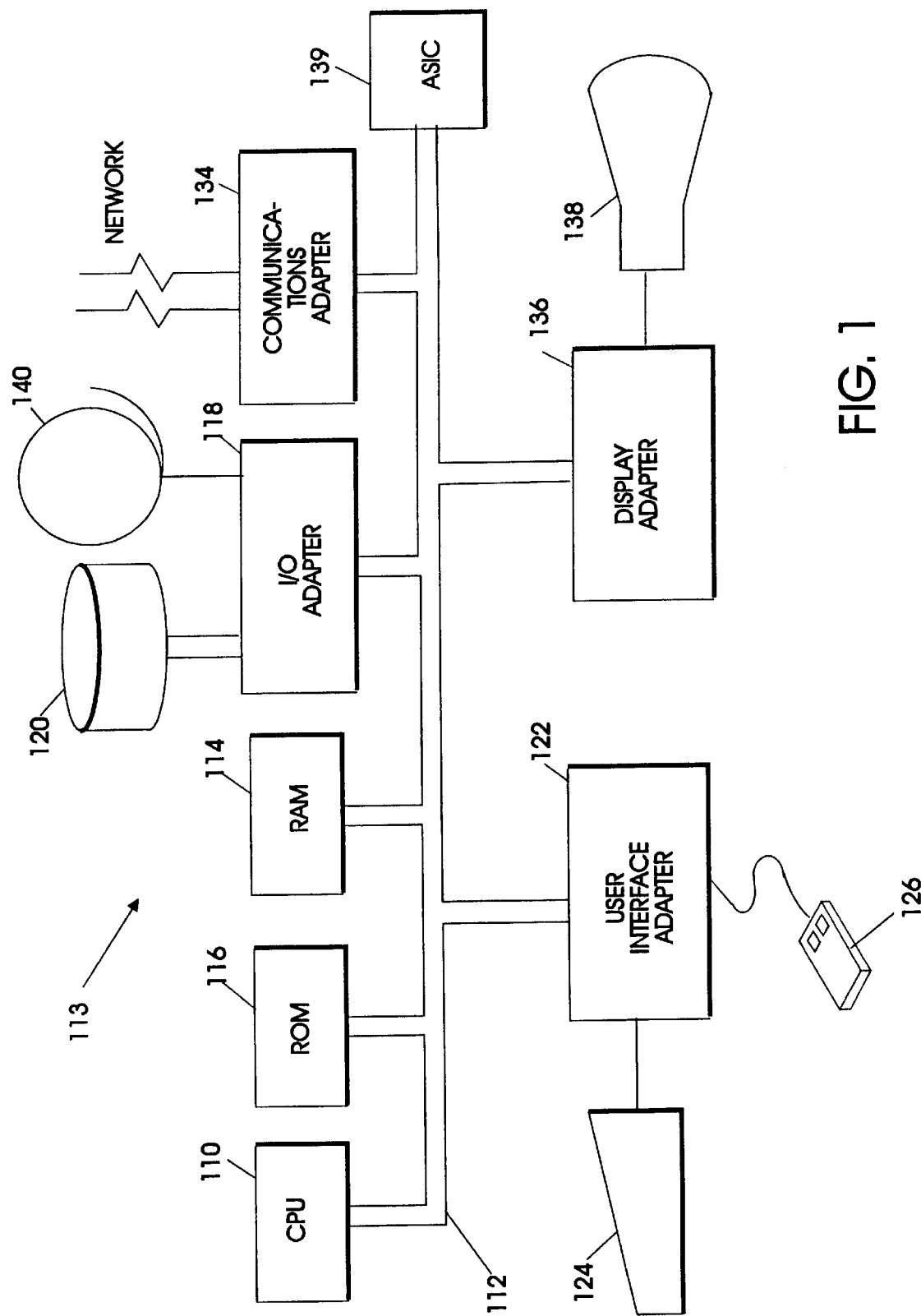
FIG. 1 illustrates a data processing system configured in accordance with the present disclosure.

In the following description, numerous specific details are set forth such as specific word or byte lengths, etc. to provide a thorough understanding of the present disclosure. However, it will be obvious to those skilled in the art that the present disclosure may be practiced without such specific details. In other instances, well-known circuits have been shown in block diagram form in order not to obscure the disclosure in unnecessary detail. For the most part, details concerning timing considerations and the like have been omitted inasmuch as such details are not necessary to obtain a complete understanding of the present disclosure and are within the skills of persons of ordinary skill in the relevant art.

Refer now to the drawings wherein depicted elements are not necessarily shown to scale and wherein like or similar elements are designated by the same reference numeral through the several views.

A representative hardware environment for practicing the present invention is depicted in FIG. 1, which illustrates a typical hardware configuration of workstation 113 having central processing unit 110, such as a conventional microprocessor, and a number of other units interconnected via system bus 112. Workstation 113 includes random access memory (RAM) 114, read only memory (ROM) 116, and input/output (I/O) adapter 118 for connecting peripheral devices such as disk units 120 and tape drives 140 to bus 112, user interface adapter 122 for connecting keyboard 124, mouse 126, speaker 128, microphone 132, and/or other user interface devices such as a touch screen device (not shown) to bus 112, communication adapter 134 for connecting the workstation to a data processing network, ASIC 139, and display adapter 136 for connecting bus 112 to display device 138.

Figure 2:
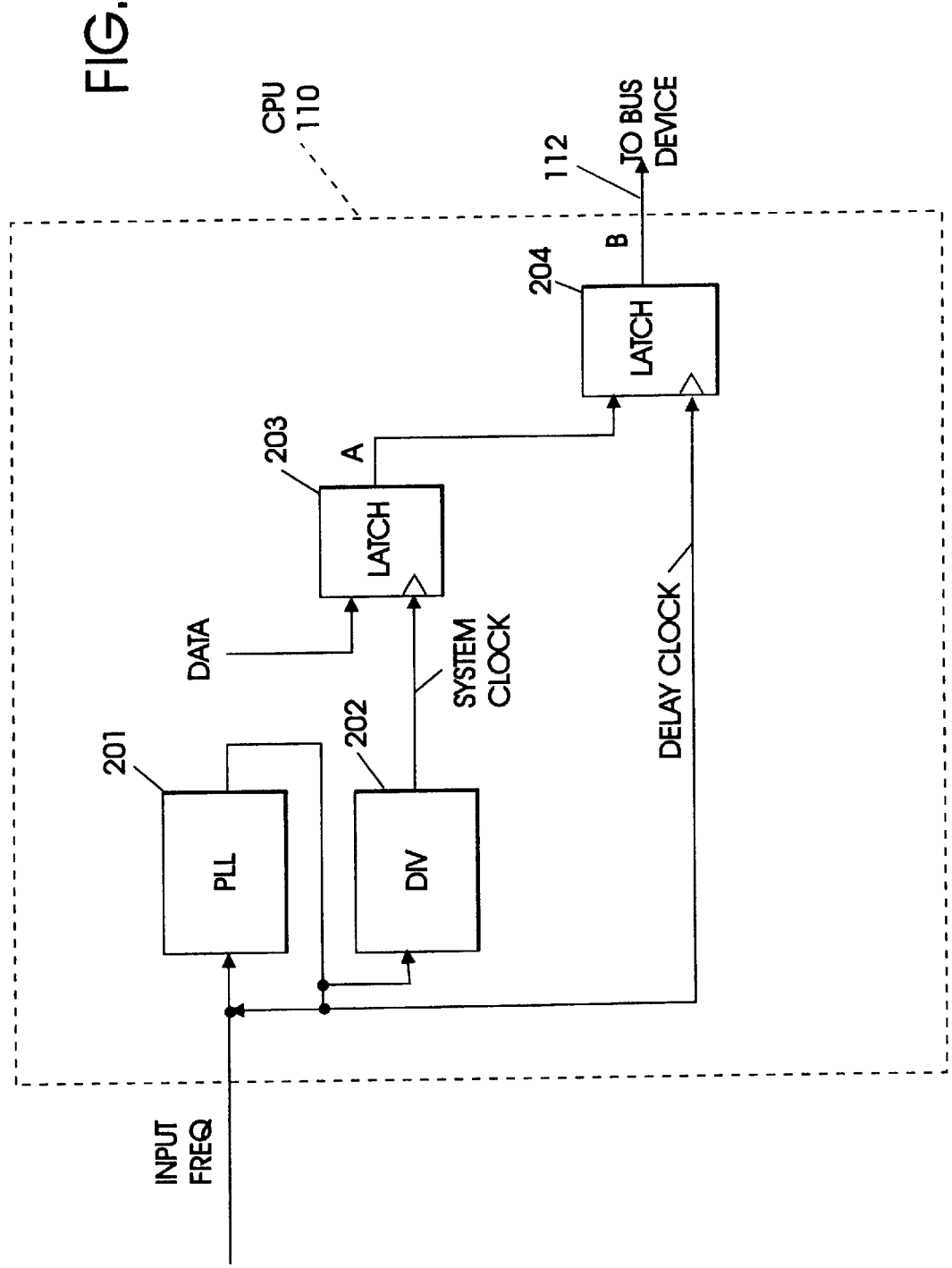
FIG. 2 illustrates a more detailed diagram of a processor configured in accordance with the present disclosure.

Referring next to FIG. 2, there is illustrated a more detailed diagram of CPU (processor) 110. CPU 110 includes PLL 201, divider circuit (DIV) 202, and latches 203 and 204, which are further described below. CPU 110 may include other circuitry (not shown for clarity) typically found in a microprocessor. A result of processing within this logic circuitry produces DATA that CPU 110 then desires to launch onto bus 112, which is also referred to as the system bus or external bus. This DATA is intended to be sent to one or more bus devices, such as I/O devices, memory devices, ASIC 139, etc. CPU 110 may be implemented on a single integrated circuit.

CPU 110 includes phase lock loop ("PLL") 201, which is well-known in the art and common to microprocessors, for receiving an input frequency (from, for example, a system clock device (not shown)) and producing output frequencies that are multiples of the input frequency. These multiple frequencies may be 2×, 3×, 4×, etc. of the input frequency, and are utilized as the internal clock(s) within CPU 110.

The output of PLL 201, which is a multiple of the system clock, is divided by divider circuit 202 to produce the System Clock. The Delay Clock indicated in FIG. 2 is equal to one of the internal clock frequencies within CPU 110 and is thus faster than the System Clock.

The System Clock is provided to the clock input of latch circuit 203, while the Delay Clock signal is provided to the clock input of latch circuit 204.

In typical designs, DATA produced within the internal circuitry of CPU 110 to be launched onto bus 112 is latched by latch 203 coupled to the System Clock. An additional latch 204 is implemented that receives the output of latch 203 and is clocked by the Delay Clock signal. The result of this configuration is that the launching of the DATA is delayed, wherein the delay is a ratio of the Delay Clock signal to the System Clock signal. For example, if CPU 110 is running with an internal clock (Delay Clock) of 66 MHz and an external or System Clock of 33 MHz, the launch of the DATA is then delayed by ½ of the internal clock, providing a 7.5 nanosecond hold time. At different internal/external clock speeds, a different number of ½ clock delays can be used. This is illustrated by the timing diagram in FIG. 3, wherein the Delay Clock signal is twice as fast as the System Clock signal. Line A corresponds to label A in FIG. 2 while line B corresponds to label B in FIG. 2.

Latch 204 can be designed so that the DATA is launched onto external bus 112 on a rising or falling edge of the Delay Clock signal. In this example, the DATA is launched ½ cycle after it would have originally been launched from latch 203 if latch 204 was not present. This delay in the launch of the DATA provides the requisite delay for the external bus devices and is process independent.

It should be understood that various changes, substitutions and alterations can be made herein without departing from the spirit and scope of the invention as defined by the appended claims.

What is claimed is:

1. Circuitry comprising:
    a first latch receiving data, said first latch clocked by a first clock signal; and
    a second latch having an input coupled to an output of said first latch, said second latch clocked by a second clock signal, wherein said second clock signal is faster than said first clock signal,
    wherein said first and second clock signals are in phase,
    wherein said first latch is operable for receiving said data from a bus device,
    wherein an output of said second latch is adaptable for coupling to an output of said bus device.

2. The circuit as recited in claim 1, wherein said bus device is a processor.

3. The circuitry as recited in claim 2, wherein said first clock signal has a frequency equal to a system clock signal of a data processing system to which said processor is coupled.

4. The circuitry as recited in claim 2, wherein said second clock signal has a frequency that is equal to an internal clock signal of said processor.

5. The circuitry as recited in claim 4, wherein said second clock signal has a frequency twice that of said first clock signal.

6. The circuitry as recited in claim 4, wherein said second clock signal has a frequency three times that of said first clock signal.

7. The circuitry as recited in claim 2, wherein said circuitry and said processor are implemented on a single integrated circuit.

8. A data processing system comprising:
    a processor;
    a system bus; and
    a bus device coupled to said processor via said system bus, wherein said processor further comprises:
        circuitry for receiving data produced within said processor for launch onto said system bus;
        circuitry for receiving a first clock signal;
        circuitry for receiving a second clock signal, wherein said second clock signal has a higher frequency than said first clock signal; and
        circuitry for delaying launch of said data onto said system bus, wherein said delay is proportional to a ratio of a frequency of said second clock signal and a frequency of said first clock signal.

9. The data processing system as recited in claim 8, wherein said first and second clock signals are in phase.

10. The data processing system as recited in claim 9, wherein said first clock signal has a frequency that is equal to a frequency of the system bus, and wherein said second clock signal is a multiple of said first clock signal.

11. The data processing system as recited in claim 9, wherein said circuitry for receiving said data and said first clock signal further comprise a first latch circuit, and wherein said circuitry for receiving said second clock signal comprises a second latch circuit, wherein an input of said second latch circuit is coupled to an output of said first latch circuit, and wherein an output of said second clock circuit is coupled to said system bus.

12. A method comprising:
    receiving data into a first latch;
    clocking said data through said first latch with a first clock signal;
    transferring said data from said first latch to a second latch; and
    clocking said data through said second latch with a second clock signal, wherein said second clock signal is faster than said first clock signal,
    wherein said first and second clock signals are in phase,
    wherein said data is received into said first latch from a bus device,
    wherein an output on said second latch is coupled to an output of said bus device.

13. The method as recited in claim 12, wherein said bus device is a processor.

14. The method as recited in claim 13, wherein said first clock signal has a frequency equal to a system clock signal of the data processing system to which said processor is coupled, and wherein said second clock signal has a frequency that is equal to an internal clock signal of said processor.

* * * * *